United States Patent Office 3,547,889
Patented Dec. 15, 1970

3,547,889
COATINGS BASED ON POLYCARBONATES
CONDENSED WITH TRIFUNCTIONAL
ISOCYANATES
Ernst-Christian Schütze, Karl-Heinz Hornung, and Rudolf Nehring, Marl, Germany, assignors to Chemische Werke Huels A.G., Marl, Germany
No Drawing. Filed Mar. 13, 1968, Ser. No. 712,595
Claims priority, application Germany, Mar. 17, 1967,
C 41,801
Int. Cl. C08g 22/06, 22/10
U.S. Cl. 260—75
14 Claims

ABSTRACT OF THE DISCLOSURE

Alkali-resistant coatings based on the condensation products of low molecular weight polycarbonates and at least trifunctional isocyanates.

BACKGROUND OF THE INVENTION

This invention relates to coating compositions based on a mixture of (a) polyesters containing free hydroxyl groups, and (b) polyfunctional isocyanates.

In a company leaflet of Farbenfabriken Bayer ("Bayer-Produkte für die Lackindustrie—Desmodur/Desmophen für Polyurethanlacke" [Bayer Products for the Varnish Industry—Desmodur/Desmophen for Polyurethane Varnishes]), there is a disclosure that free-hydroxyl containing polyesters can be cross-linked with either polyfunctional isocyanates or precursors of the latter which, under heat, form isocyanates. The resultant coatings, however, are limited in their field of use because of a relatively low resistance to aqueous alkali.

SUMMARY

An object of this invention, therefore, is to improve the alkali resistance of coatings based on polyesters containing free hydroxyl groups and polyfunctional isocyanates.

Another object is to provide novel coating compositions as well as novel coated products.

Upon further study of the specification and claims, other objects and advantages of the present invention will become apparent.

These objects are attained by providing coating compositions of:

(a) Linear polycarbonates of the general formula

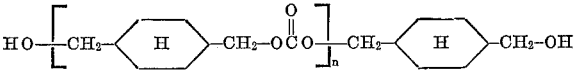

wherein $n$ represents 1 to 20, preferably 2 to 13, or the reaction products thereof with less than stoichiometric amounts of dicarboxylic acids or anhydrides thereof; and (b) Compounds having at least three isocyanate groups or compounds yielding such isocyanates at elevated temperatures.

In general, there are a maximum of two free hydroxy groups per molecule of linear polycarbonate (a). By reaction of a polycarbonate with dicarboxylic acids or anhydrides thereof in a molar ratio of about 2:1 to 10:9, preferably 2:1 to 5:4, there are obtained products, which contain two hydroxy groups per molecule of the reaction product, if the esterification reaction was complete; however it is also possible, to use products from incomplete esterification, which may contain as low as 1.8 hydroxy groups per molecule.

Compound (b) is referred to as the "trifunctional isocyanate" even though more than three isocyanate groups, for example, up to 6 isocyanate groups, can be present in the compound. In general, the molar ratio of the isocyanate groups is about 0.5 to 2, preferably 0.75 to 1.25 isocyanate groups per free hydroxy group in compound (a).

DETAILED DISCUSSION OF THE INVENTION

Linear polycarbonates of the above general formula can be produced, for example, by reacting 1,4-bis-(hydroxymethyl)-cyclohexane with phosgene. In this connection, 1,4-bis-(hydroxymethyl)-cyclohexane can be employed in its trans- or cis-form or as a mixture of both forms. This process permits the adjustment of a specific desired value for $n$, $n$ representing the average value of a series of polymer homologs. For additional details of this process, reference is invited to Belgian Pat. No. 693,956 and U.S. application Ser. No. 610,230, filed Jan. 19, 1967.

In order to improve the solubility of the linear polycarbonates in the varnish solvents, and to avoid crystallization of the polycarbonates therefrom, it can be advantageous to react the polycarbonates with about 50 to 90%, preferably about 50 to 80% of the stoichiometric molar amounts of dicarboxylic acid. For this purpose, a mixture of polycarbonate and dicarboxylic acid (or dicarboxylic acid anhydride) is heated to temperatures between 140 and 210° C., preferably to 180–200° C., while the liberated water of condensation is continuously distilled off. For increasing the reaction rate, it is advantageous to pass a stream of inert gas through or over the reaction mixture to carry away the evolved steam. Examples of dicarboxylic acids suitable for the reaction include, but are not limited to, phthalic acid, isophthalic acid, hexahydrophthalic acid, succinic acid, and adipic acid, it being preferred that such dicarboxylic acids be hydrocarbon dicarboxylic acids of about 4 to 12, preferably 4 to 8 carbon atoms.

The at least trifunctional isocyanates to be used in this invention can be produced, for example, by reacting diisocyanates with tri- and/or tetravalent alcohols, in accordance with German Pat. 870,400. Precursor compounds from which such isocyanates can be produced at elevated temperatures include, but are not limited to, room temperature stable reaction products of isocyanates with e.g., phenol, N-methylaniline, or malonic ester. From these "precursor" reaction products, the isocyanates can be liberated upon heating to about at least 130, preferably at about 180° C. (See, for example, "Liebig's Ann. Chem." [Liebig's Annals of Chemistry], 562 (1949), pp. 205–229.) Among the at least trifunctional isocyanate compounds and precursors thereof, the compounds preferred for this invention include reaction products from polyols e.g. glycerol, trimethylolpropane, trimethylolethane, pentaerythritol or sorbitol with diisocyanates e.g. 2,4-toluylene-diisocyanate, 2,6-toluylene-diisocyanate or mixtures of these isomers, hexamethylene-diisocyanate or diphenylene-diisocyanate, and reaction products of so prepared poly-isocyanates with e.g. phenol, N-methyl-aniline or butanol.

Isocyanates (or precursors thereof), and linear polycarbonates (or the reaction products thereof with dicarboxylic acids) are preferably employed in such ratios that the amounts of isocyanate groups and hydroxyl groups are equivalent to each other, but as hereinbefore indicated, there are also often selected ratios wherein equimolarity is not present. For example more flexible and better adhesive coatings are often obtained by using minor amounts of isocyanates, whereas an excess of isocyanate groups increases the hardness of the films and their resistance against attack by chemicals.

For producing the coatings, the linear polycarbonate (or the reaction product thereof with a dicarboxylic acid) and the isocyanate component are dissolved in conventional varnish solvents, so yielding solutions with a solid content of 10 to 80, preferably 30 to 60% by weight. The resultant varnish is applied by any conventional method, and then cured. If free isocyanates are used, the curing process begins at room temperature (about 20–25° C.), which means that the coating application must be attended to with care. The varnish solvents to be employed are those which are inert to isocyanates, i.e. solvents lacking active hydrogen, preferably hydrocarbons, ketones, esters or ethers and the like, particularly preferred being ethylacetate, butylacetate, Cellosolve-acetate, methyl-ethylketone, methyl-isobutyl-ketone, cyclohexanone, benzene, toluene, xylene, or mixtures thereof.

Though, for certain substrates and under certain conditions, a room temperature cure is highly desirable, it is also possible to conduct the cross-linking process at elevated temperatures in order to shorten the cure time.

If the disadvantages of limited time application and/or the exclusion of certain solvent classes cannot be tolerated, then the so-called isocyanate precursors should be employed. The cross-linking reaction then takes place only under heat. Aside from the previously mentioned solvents inert to isocyanate, it is also possible to employ alcohols e.g. butanol, isopropanol, mono-esters of ethyleneglycol or propyleneglycol alone or preferably in mixtures with the above mentioned solvents.

Owing to the improved alkali-resistance of the coatings of this invention, this invention is particularly beneficial for providing coatings on alkaline reacting substrates e.g. asbestos-cement or for coatings, which often may be attacked by alkaline substances.

Otherwise, the coating composition of this invention can also be employed in the same manner as the known polyester-triisocyanate coating compositions.

Though at least trifunctional isocyanates or precursors thereof are preferred, it is also possible to substitute minor amounts, up to about 20% of the stoichiometric molar amounts, of the at least trifunctional isocyanates by diisocyanates or precursors thereof. By this replacement the flexiblity of the films may be increased.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

100 grams of a 50% solution of a polycarbonate of the previously given general formula ($n=2$) in ethyl acetate is mixed with 99.4 g. of a 50% solution of a commercially available triisocyanate in ethyl acetate, and the resulting varnish is applied to steel test sheets. (The triisocyanate employed herein is a reaction product of trimethylol propane and toluylene disocyanate in a ratio of 1:3; it is sold under the name of Desmodur L.") The films cured for 30 minutes at 130° C. exhibit a hardness in accordance with DIN (German Industrial Standard) 53,157 of 124 seconds and an Erichsen depression in accordance with DIN 53,156 of 9.7 mm. The resistance of the film to saponification is tested by immersion in a 10% sodium hydroxide solution heated to 90–95° C. After 9 hours, there are no visible changes in the film. The hardness of an unbaked film left for three days at room temperature is 106 seconds.

EXAMPLE 2

100 grams of a 50% solution of a polycarbonate of the above general formula ($n=4$) in ethyl acetate is mixed with 58.2 g. of a 50% solution of the commercially available triisocyanate in ethyl acetate described in Example 1, and the resultant varnish is applied to metal test sheets. The films baked for 30 minutes at 130° C. have a hardness of 118 seconds and an Erichsen depression of >10 mm. There is no damage to the films even after being subjected for 9 hours to a 10% sodium hydroxide solution at 90–95° C. The hardness of the unbaked film left for three days at room temperature is 62 seconds.

EXAMPLE 3

100 grams of a 50% solution of a polycarbonate of the above general formula ($n=13$) in ethyl acetate is mixed with 20.8 g. of a 50% solution of the commercially sold triisocyanate in ethyl acetate described in Example 1, and the resulting varnish is applied to metal test sheets. The films baked for 30 minutes at 130° C. exhibit a hardness of 114 seconds and an Erichsen depression of >10 mm. There is no damage to the coatings after 9 hours in a 10% sodium hydroxide solution at 90–95° C.

EXAMPLE 4

A polycarbonate of the above general formula ($n=2$) is esterified with succinic acid anhydride in a molar ratio of 3:2 at 200° C., with the liberated water being distilled off, until the acid number has decreased to 2. One hundred grams of a 50% solution of the product in a xylene-butyl acetate-cyclohexanone mixture (8:4:1 parts by weight) is mixed with 30.6 g. of a 50% solution of the commercially sold triisocyanate in ethyl acetate described in Example 1, and the resultant varnish is applied to metal test sheets. The coatings baked for 30 minutes at 130° C. exhibit a hardness of 115 seconds and an Erichsen depression of >10 mm. Subjecting the coatings for 9 hours to 10% sodium hydroxide solution at 90–95° C. does not result in any damage thereto.

EXAMPLE 5

100 grams of the 50% solution of the polycarbonate ester set forth in Example 4 is mixed with 44.5 g. of a 50% solution of a commercial isocyanate "precursor" in ethyl acetate, and the resultant varnish is applied to metal test sheets. (The isocyanate "precursor" employed is a reaction product of trimethylol propane and toluylene diisocyanate in a ratio of 1:3 wherein the free isocyanate groups are blocked by phenol. This substance is sold commercially under the designation of "Desmodur AP, stable.") The coatings baked at 180° C. for 30 minutes have a hardness of 196 seconds and an Erichsen depression of >10 mm. Subjecting the coatings for 9 hours to 10% sodium hydroxide solution at 90–95° C. does not lead to any damage of the coatings.

EXAMPLE 6

100 grams of a 50% solution of a polycarbonate of the above general formula ($n=4$) in ethyl acetate is mixed with 84.5 g. of a 50% solution of the commercial isocyanate liberator described in Example 5, in ethyl acetate, and the resultant varnish is applied to metal test sheets. The coatings, baked for 30 minutes at 180° C. exhibit a hardness of 212 seconds and an Erichsen depression of 10 mm. Subjecting the coatings for 9 hours to 10% sodium hydroxide solution at 90–95° C. does not lead to any damage of the coatings.

The following examples illustrate and compare the alkali resistance of prior art coatings.

COMPARATIVE EXAMPLE I 100 grams of a 50% solution of a commercial polyester of 3 mols of adipic acid, 1 mol of a triol, and 3 mols of a diol (Desmophen 1200) in ethyl acetate is mixed with 74 g. of a 50% solution of the commercial triisocyanate in ethyl acetate described in Example 1, and the resultant varnish is applied to metal test sheets. The coatings baked for 30 minutes at 130° C. become cloudy immediately upon introduction into 10% sodium hydroxide solution heated to 90–95° C. After testing for 6 hours, the coating is completely disintegrated.

COMPARATIVE EXAMPLE II 100 grams of a 50% solution of a commercial polyester of 3 mols of adipic acid, 2 mols of triol, and 2 mols of diol (Desmophen 1100) in ethyl acetate is mixed with 92.3 g. of a 50% solution of the commercial triisocyanate in ethyl acetate described in Example 1, and the resultant varnish is applied to metal test sheets. The coatings, baked for 30 minutes at 130° C. exhibit a cloudiness immediately upon introduction into 10% sodium hydroxide solution heated to 90–95° C. After testing for 9 hours, the coating is completely disintegrated.

COMPARATIVE EXAMPLE III 100 grams of a 50% solution of a commercial polyester from 3 mols of adipic acid, 2 mols of triol, and 2 mols of diol (Desmophen 1100) in ethyl acetate is mixed with 133.8 g. of a 50% solution of the commercial isocyanate precursor in ethyl acetate described in Example 5, and the resultant varnish is applied to metal test sheets. The coatings, baked for 30 minutes at 130° C. become cloudy immediately upon introduction into 10% sodium hydroxide solution heated to 90–95° C. After testing for 9 hours, there is substantial damage to the coatings.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

In the following claims, the expression "trifunctional isocyanate" is intended to mean a compound having at least 3 free isocyanate groups or a precursor thereof which liberates the isocyanate group upon heating.

What is claimed is:
1. A coating composition comprising:
   (a) a free-hydroxy-containing compound selected from the group consisting of a linear polycarbonate of the formula

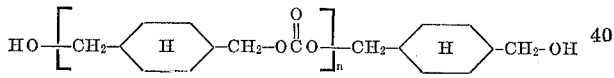

wherein $n$ represents 1 to 20, and esters thereof with less than stoichiometric molar amounts of a member selected from the group consisting of a dicarboxylic acid, an anhydride thereof, and mixtures thereof; and
   (b) a trifunctional isocyanate, wherein the molar ratio of isocyanate groups per free hydroxy group is about 0.5 to 2.

2. A coating composition as defined by claim 1 further comprising an inert solvent.
3. A coating composition as defined by claim 1 wherein said free-hydroxy-containing compound is said linear polycarbonate.
4. A coating composition as defined by claim 1 wherein said free-hydroxy-containing compound is said ester.
5. A coating composition as defined by claim 1 wherein the ratio of isocyanate groups to free hydroxy groups is substantially 1:1.
6. A substrate having a cured coating of a composition as defined by claim 1.
7. A substrate having a cured coating of a composition as defined by claim 2.
8. A substrate having a cured coating of a composition as defined by claim 3.
9. A substrate having a cured coating of a composition as defined by claim 4.
10. A substrate having a cured coating of a composition as defined by claim 5.
11. A coating composition as defined by claim 1 wherein $n$ is 2 to 13.
12. A coating composition as defined by claim 1 wherein said molar ratio is 0.75 to 1.25.
13. A coating composition as defined by claim 11 wherein said molar ratio is 0.75 to 1.25.
14. A coating composition as defined by claim 1 wherein said trifunctional isocyanate is a reaction product of a polyol selected from the group consisting of glycerol, trimethylolpropane, trimethylolethane, pentaerythritol or sorbital with diisocyanates e.g. 2,4-tolylene-diisocyanate, 2,6-toluylene-diisocyanate or mixtures of these isomers, hexamethylene-diisocyanate or diphenylene-diisocyanate, and reaction products thereof with a member selected from the group consisting of phenol, N-methyl aniline and butanol.

References Cited
UNITED STATES PATENTS

| 2,787,630 | 4/1957 | Katz et al. | 260—463 |
| 3,227,680 | 1/1966 | Tamblyn et al. | 260—75 |
| 3,245,963 | 4/1966 | Schramm et al. | 260—77.5 |
| 3,248,416 | 4/1966 | Stevens | 260—77.5 |
| 3,449,467 | 6/1969 | Wynstra | 260—850 |

JOHN C. BLEUTGE, Primary Examiner

U.S. Cl. X.R.

117—132, 161; 260—31.2, 31.4, 32.8, 33.2, 33.6, 77.5, 463